June 17, 1930.　　　　J. B. TEESDALE　　　　1,764,186
COMBINED CHECK VALVE AND UNION
Filed June 13, 1928
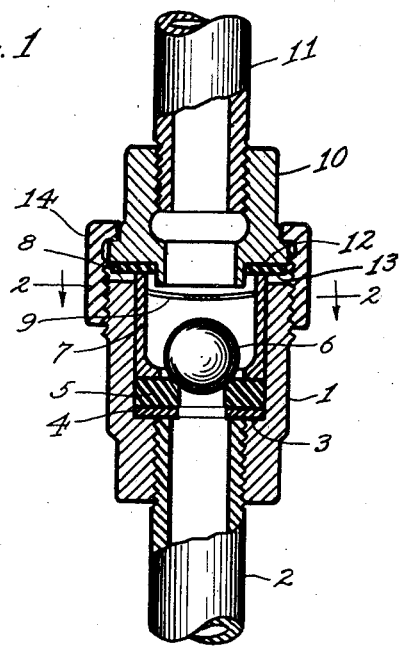
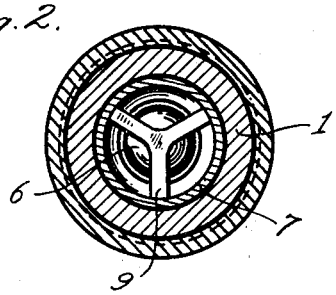
INVENTOR
John B. Teesdale,
BY Cyrus N. Rice,
ATTORNEY
Witness:

Patented June 17, 1930

1,764,186

UNITED STATES PATENT OFFICE

JOHN B. TEESDALE, OF EAST GRAND RAPIDS, MICHIGAN

COMBINED CHECK VALVE AND UNION

Application filed June 13, 1928. Serial No. 284,915.

This invention relates to the construction of a combined check valve and union.

The main objects of this invention are to provide a combined check valve and union that is of simple construction; to provide a device of this character which may be readily disassembled for replacement and renewal of parts; to provide a device of this character in which the check valve will properly function with very little head pressure; and to provide a device in which the liability of leakage is reduced to a minimum.

An illustrative embodiment of this invention is shown in the accompanying drawings, in which:—

Fig. 1 is a vertical sectional view of my improved check valve and union, shown connected in a pipe line.

Fig. 2 is a sectional view of the same taken on the line 2—2 of Fig. 1.

Heretofore considerable difficulty has been experienced in securing a check valve which will not leak when used in a fluid line having a very low head pressure. Furthermore, the usual set of piping connections have included both a check valve and a union as separate independent units.

In my improved constructon, the valve is such that no leakage occurs when used with low head pressure, and by combining the check valve and union in one unit, the cost is materially lower than where separate units are used.

In the construction shown in the drawings, a main body member 1 is provided with an axial bore therethrough, the outer end of which is threaded to receive a pipe 2, and the inner end of which is of greater diameter than said threaded outer end. Medial of the bore, where the diameters change, an annular shoulder 3 is provided, which supports a metal washer 4, upon which is carried a ring shaped gasket 5 of pliable material such as leather.

The gasket 5 forms a valve seat for a valve which is preferably in the form of a steel ball 6. The inner portion of the axial bore, which is of the greater diameter, has a sleeve 7 slidably mounted therein. One end of the sleeve 7 bears against the ring gasket 5, and the other end thereof projects slightly beyond the inner end 8 of the body member 1. A spider 9 of resilient metal is frictionally mounted in the sleeve 7 for loosely retaining the ball 6 when the device is in partially assembled relationship, and for limiting the distance which the ball may be lifted from its seat, when the device is in use.

A second body member 10, which is preferably the swivel member of a standard cast iron union, is provided with an axial bore, the outer end of which is threaded to receive a pipe 11. The member 10 is adapted to be assembled in axial alignment with the member 1, as is customary in unions of this character, and the inner face 12 thereof, which is in opposed relation to the annular shoulder 3, is provided with a ring gasket 13 which is arranged to bear or abut against the protruding end of the sleeve 7.

The body members 1 and 10 are drawn toward each other and held in assembled relationship by a coupling ring 14, of standard design, which swivelly engages an outwardly disposed annular flange on the body member 10, and threadably engages the body member 1, as is customary in unions of this character.

In the use of this device, the members 1 and 10 are threaded on the ends of the pipes 2 and 11 respectively. The washer 4, valve seat gasket 5, sleeve 7, ball valve 6 and spider 9, are then placed in the enlarged bore of the member 1 in the order named. It is to be understood, of course, that this device is to be used in a vertical position as shown in Fig. 1 of the drawings.

The gasket 13 is then placed in position against the face 12 of the member 10, and the two body members placed in axial alignment. The coupling ring 14 is then threaded down on the member 1, thus drawing the body members toward each other and causing the sleeve 7 to tightly bind gaskets 5 and 13 against their respective supporting faces.

The steel ball valve 6 cooperating with the pliable valve seat gasket 5 provides a very efficient check valve that works satisfactorily under low head pressure.

Although but one specific embodiment of this invention has been herein shown and described, it will be understood that numerous details of the construction shown may be altered or omitted without departing from the spirit of this invention as defined by the following claims.

I claim:

1. A combined check valve and union, comprising a pair of tubular body members adapted to abut end to end in axial alignment, a ring shaped gasket forming a valve seat carried in the bore of one of said members, a valve for said seat, a sleeve slidable in said member with one end thereof engaging said gasket, said other member being adapted to engage said sleeve, and a coupling for joining said members and causing said sleeve to bear against said gasket.

2. A combined check valve and union, comprising a main body member having a passageway therethrough, an annular shoulder in said passageway, a ring shaped gasket supported on said shoulder forming a valve seat, a valve for said seat, a sleeve slidable in said passageway, one end of said sleeve abutting against said gasket, the other end of said sleeve protruding beyond the end of said body member, a second tubular body member having a face adapted to abut against the protruding end of said sleeve when in axial alignment therewith, and a coupling ring engaging both of said body members for drawing said members toward each other whereby said sleeve makes a sealed connection with each of said gasket members.

3. A combined check valve and union, comprising a main body member having a passageway therethrough, an annular shoulder in said passageway, a ring shaped gasket supported on said shoulder forming a valve seat, a valve for said seat, a sleeve slidable in said passageway, one end of said sleeve abutting against said gasket, the other end of said sleeve protruding beyond the end of said body member, a second tubular body member having a face adapted to abut against the protruding end of said sleeve when in axial alignment therewith, a gasket interposed between said face and sleeve end, and a coupling ring engaging both of said body members for drawing said members toward each other whereby said sleeve makes a sealed connection with each of said gasket members.

4. A combined union and check valve, comprising a main body member having an axial bore therethrough, the inner end of said bore being of greater diameter than the outer end thereof, an annular shoulder at the point where said bore changes diameter, a ring shaped gasket of pliable material supported on said shoulder to form a valve seat, a ball valve for cooperating with said seat, a sleeve slidable in the large portion of said bore, one end of said sleeve abutting against said gasket, the other end of said sleeve protruding beyond the end of said body member, a spider in said sleeve for loosely retaining said ball valve, a second body member having an axial bore therethrough and adapted to be assembled in axial alignment with said main body member, a ring shaped gasket carried by said second body member and adapted to abut against the protruding end of said sleeve, and a coupling ring swivelly engaging one of said body members and threadably engaging the other of said body members for drawing said members toward each other whereby said sleeve binds against and seals both of said gaskets.

In testimony whereof I have hereunto set my hand at Grand Rapids, Michigan, this 1st day of June, 1928.

JOHN B. TEESDALE.